US012004577B2

(12) United States Patent
Mao

(10) Patent No.: US 12,004,577 B2
(45) Date of Patent: Jun. 11, 2024

(54) GLOVE MAGNETIC ATTRACTION KIT DEVICE

(71) Applicant: Yongjian Mao, Rugao (CN)

(72) Inventor: Yongjian Mao, Rugao (CN)

( * ) Notice: Subject to any disclaimer, the term of this patent is extended or adjusted under 35 U.S.C. 154(b) by 128 days.

(21) Appl. No.: 17/726,456

(22) Filed: Apr. 21, 2022

(65) Prior Publication Data

US 2023/0309636 A1 Oct. 5, 2023

(30) Foreign Application Priority Data

Mar. 30, 2022 (CN) ........................ 202220726811.X

(51) Int. Cl.
*A41D 19/00* (2006.01)
*A41F 1/00* (2006.01)
*H01F 7/02* (2006.01)

(52) U.S. Cl.
CPC .......... *A41D 19/0037* (2013.01); *A41F 1/002* (2013.01); *H01F 7/02* (2013.01)

(58) Field of Classification Search
CPC ........................ A41D 19/0024; A44D 2203/00
See application file for complete search history.

(56) References Cited

U.S. PATENT DOCUMENTS 4,847,917 A * 7/1989 Strongwater .......... A41D 27/08 2/244
9,955,757 B1 * 5/2018 Ng ......................... A43B 23/24
2002/0076520 A1 * 6/2002 Neeb ................... A61F 13/5622 428/100
2007/0113383 A1 * 5/2007 Grunberger ........ A45C 13/1069 24/303
2010/0212065 A1 * 8/2010 Yeh ......................... A41G 7/00 2/206
2012/0240623 A1 * 9/2012 Morse .................... A44C 7/002 63/12
2016/0066656 A1 * 3/2016 Ferris ....................... A44C 3/00 24/303
2023/0133521 A1 * 5/2023 Zabkar, Jr. ......... A41D 19/0024 2/160

FOREIGN PATENT DOCUMENTS

CN 213370130 U 6/2021
KR 200365447 Y1 * 10/2004 ............ A41D 19/00
KR 2014-0002119 U * 4/2014 ............ A44B 11/00

OTHER PUBLICATIONS

Translation of KR200365447Y1 (Year: 2004).*
Translation of KR 2014-0002119U (Year: 2014).*

* cited by examiner

*Primary Examiner* — Sally Haden
*Assistant Examiner* — Grady Alexander Nunnery
(74) *Attorney, Agent, or Firm* — Zhigang Ma

(57) ABSTRACT

A glove magnetic attraction kit device is provided and includes glove bodies, and magnetic attraction devices arranged on wrist parts of the glove bodies respectively. Each of the magnetic attraction devices includes a base, a blind hole is arranged in a middle of the base, and a hollow convex plate used to place a magnetic attraction body is arranged on the base. A side part of the convex plate is provided with an opening used for taking out the magnetic attraction body. The glove magnetic attraction kit device has advantages of strong practicability, reasonable structure, low cost, simple use, safety and reliability.

8 Claims, 3 Drawing Sheets

GLOVE MAGNETIC ATTRACTION KIT DEVICE

TECHNICAL FIELD

The disclosure relates to the field of glove device technologies, and more particularly to a glove magnetic attraction kit device.

BACKGROUND

At present, gloves sold in the market do not have a function of mutual magnetic attraction. After daily use, it is found that a pair of gloves are easy to disperse after being pulled off, and one of the gloves is generally easy to be lost, resulting in generating search time and delaying work efficiency. People want a glove magnetic attraction kit.

After repeated improvement, the disclosure designs a suitable and commonly used magnetic attraction kit device, which meets the needs of consumers and meets the needs of social development.

Chinese Patent Application No. CN 202022359151.X (corresponding to Chinese patent publication No. CN 213370130 U), filed on Oct. 21, 2020 and published on Jun. 8 2021, with a title of magnetic assembly glove, which relates to the field of workshop auxiliary tool technologies and discloses that the magnetic assembly glove includes a glove body and magnetic structures, the glove body is provided with a palm part and a plurality of finger parts connected to the palm part, at least one finger part is provided with the magnetic structure, and the magnetic structure is used for attracting components and parts which can be magnetically attracted, an assembling worker wears the magnetic assembly glove on his hand for assembling operation, and when the components and parts capable of being magnetically attracted are assembled, the components and parts are attracted to the hand of the worker through the magnetic structure of the magnetic assembly glove, so that the assembling operation is facilitated, and the components and parts are not prone to falling off; by using the magnetic assembly glove, the falling frequency of the components and parts can be reduced in the assembly operation, and the assembly efficiency and the production speed are improved.

The above patent application discloses the magnetic assembly glove, which is not practical. The finger parts of the glove are provided with the magnetic structures, once the magnetic structure falls off, it is very inconvenient to use, so the magnetic assembly glove of the above patent application cannot meet the needs of consumers.

SUMMARY

The main purpose of the disclosure is to provide a glove magnetic attraction kit device with strong practicability, reasonable structure, low cost, simple use, safety and reliability.

In order to realize the purpose of the disclosure, the disclosure provides a glove magnetic attraction kit device, including: glove bodies; magnetic attraction devices, arranged on wrist parts of the glove bodies respectively; each of the magnetic attraction devices including: a base, a middle of the base being provided with a blind hole; and a hollow convex plate, arranged on the base and configured to place a magnetic attraction body.

In an embodiment, a side part of the convex plate is provided with an opening configured to take out the magnetic attraction body.

In an embodiment, the convex plate is provided with at least one identification post thereon.

In an embodiment, each of the magnetic attraction devices is made of a silica gel material.

In an embodiment, a shape of the base is elliptical.

In an embodiment, the base is the elliptical base with a size of 24 millimetres (mm)*40 mm and a thickness of 2 mm.

In an embodiment, the blind hole has a diameter of 10 mm and a depth of 4 mm.

In an embodiment, a size of the convex plate is 18 mm*15 mm*3 mm.

In an embodiment, a distance between the opening and a top of the convex plate is 1.2 mm.

In an embodiment, the magnetic attraction body is a cylinder with a diameter of 10 mm and a thickness of 4 mm.

The beneficial effects of the technical solutions provided by the disclosure are as follows: 1) the magnetic attraction device is provided on the wrist part of the glove body, which can make the gloves magnetic attract and store each other, so as to prevent the loss of the gloves, save time, and especially improve the work efficiency in the workplace; 2) the disclosure has the advantages of reasonable structure, low cost and more convenient use; 3) the magnetic attraction storage effect of the disclosure is better, the use is more safe and reliable, and is suitable for general popularization.

BRIEF DESCRIPTION OF DRAWINGS

In order to more clearly explain embodiments of the disclosure or the technical solutions in the related art, the following will briefly introduce the attached drawings that need to be used in the embodiments or the description of the related art. It is obvious that the attached drawings in the following description are only some embodiments of the disclosure. For those skilled in the art, without paying creative labor, other drawings can also be obtained according to the structure shown in these drawings.

DESCRIPTION OF REFERENCE NUMERALS

100—glove body; 200—magnetic attraction device; 300—sewing thread; 201—base; 202—convex plate; 2021—identification post; 203—bland hole; 204—opening.

The realization of the purpose, functional features and advantages of the disclosure will be further described in combination with the embodiments and with reference to the attached drawings.

DETAILED DESCRIPTION OF EMBODIMENTS

Next, the technical solutions in the embodiments of the disclosure will be described clearly and completely in combination with the attached drawings in the embodiments of the disclosure. Obviously, the described embodiments are only part of the embodiments of the disclosure, not all of the embodiments. Based on the embodiments of the disclosure, all other embodiments obtained by those skilled in the art without creative work belong to the protection scope of the disclosure.

It should be noted that in the embodiments of the disclosure, all directional indications (such as up, down, left, right, front, rear . . . ) are only used to explain the relative position relationship and movement between components under a specific attitude (as shown in the attached drawings). If the specific attitude changes, the directional indication will change accordingly.

In the disclosure, unless otherwise specified and limited, the terms “connected”, “fixed” and so on should be understood in a broad sense. For example, “fixed” can be fixed connection, removable connection or integrated; or can be mechanical connection or electrical connection; or can be directly connected or indirectly connected through an intermediate medium; or can be the connection within two elements or the interaction relationship between two elements, unless otherwise clearly defined. For those skilled in the art, the specific meaning of the above terms in the disclosure can be understood according to the specific situation.

In addition, in the disclosure, the description of “first”, “second” and the like is only for the purpose of description, and cannot be understood as indicating or implying its relative importance or implicitly indicating the number of indicated technical features. Thus, the features defining “first” and “second” may include at least one of the features explicitly or implicitly. In addition, the technical solutions between various embodiments can be combined with each other, but it must be based on the realization of those skilled in the art. When the combination of technical solutions is contradictory or impossible, it should be considered that the combination of technical solutions does not exist and is not within the protection scope required by the disclosure.

The disclosure provides a glove magnetic attraction kit device.

Figure 1:
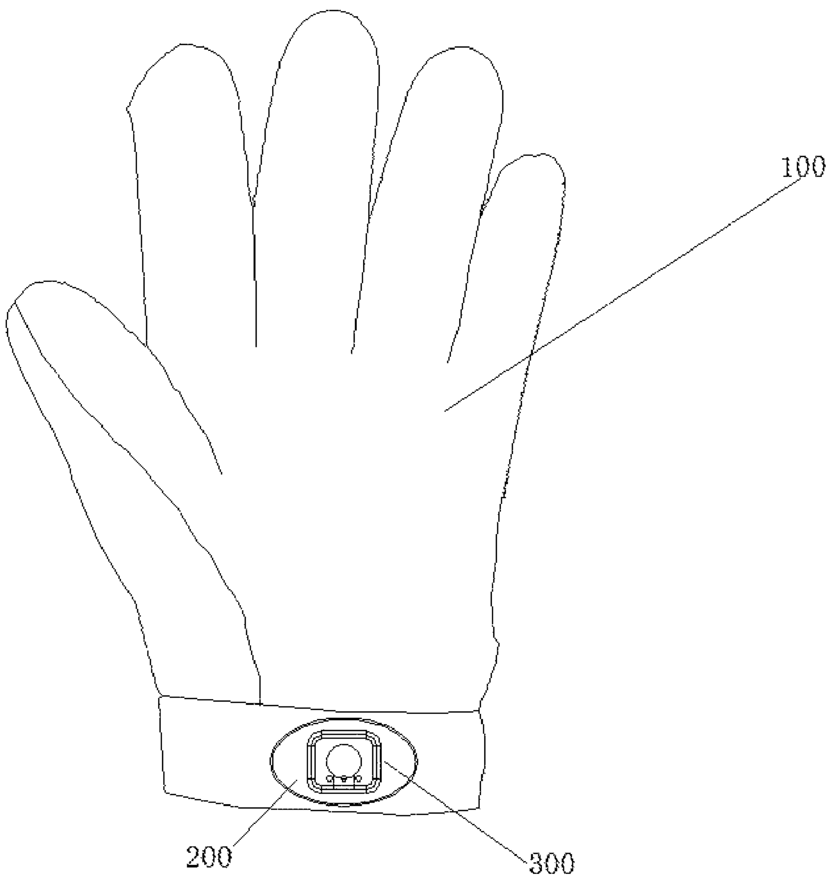
FIG. 1 is a schematic structural view of a glove structure of a glove magnetic attraction kit device according to an embodiment of the disclosure.
Figure 2:
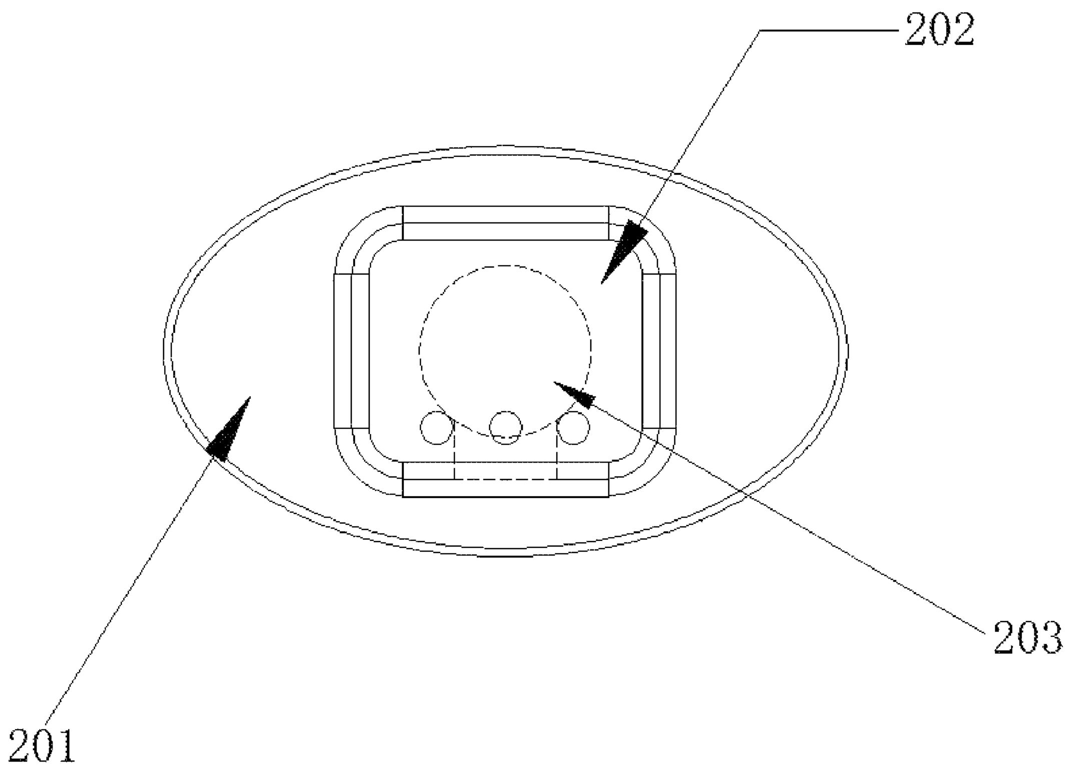
FIG. 2 is a schematic front view of a magnetic attraction device of a glove magnetic attraction kit device according to an embodiment of the disclosure.
Figure 3:
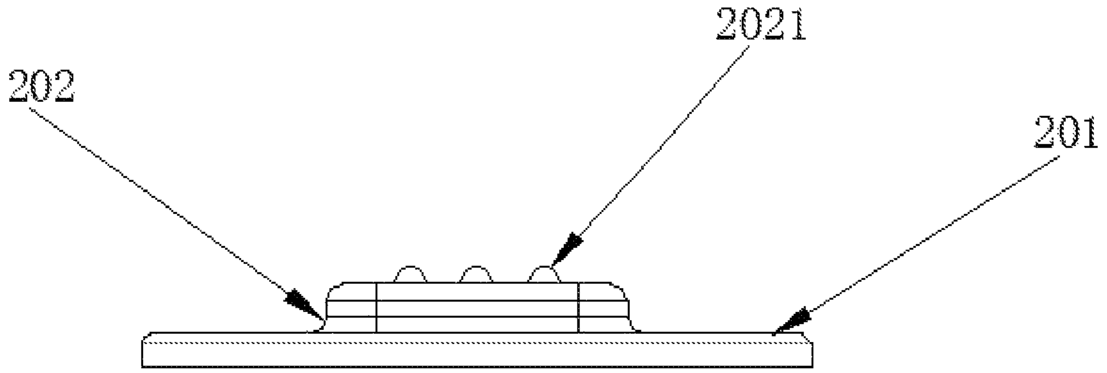
FIG. 3 is a schematic vertical view of the magnetic attraction device of the glove magnetic attraction kit device according to the embodiment of the disclosure.
Figure 4:
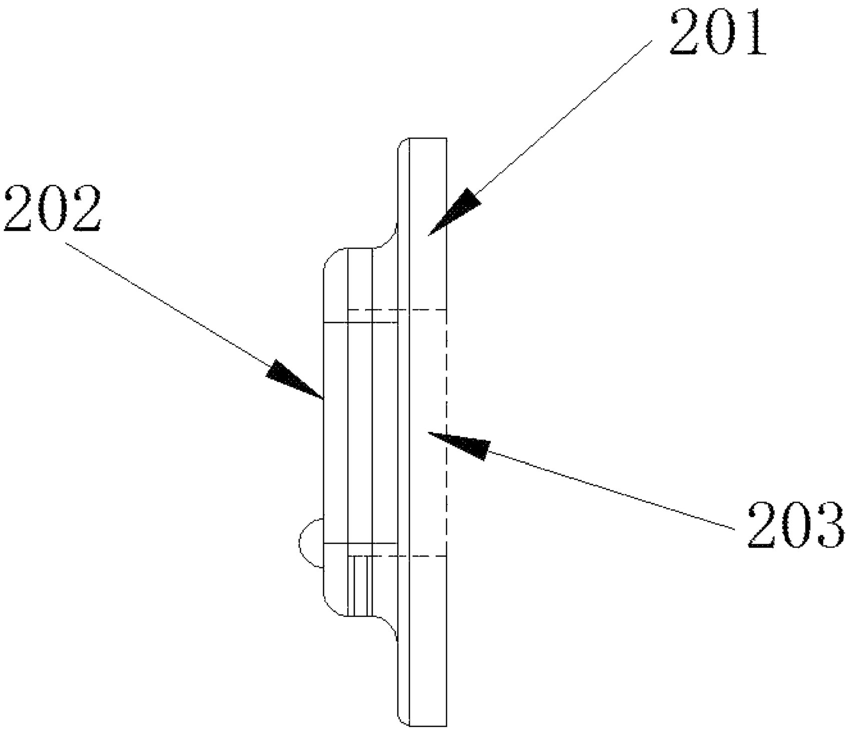
FIG. 4 is a schematic side view of the magnetic attraction device of the glove magnetic attraction kit device according to the embodiment of the disclosure.
Figure 5:
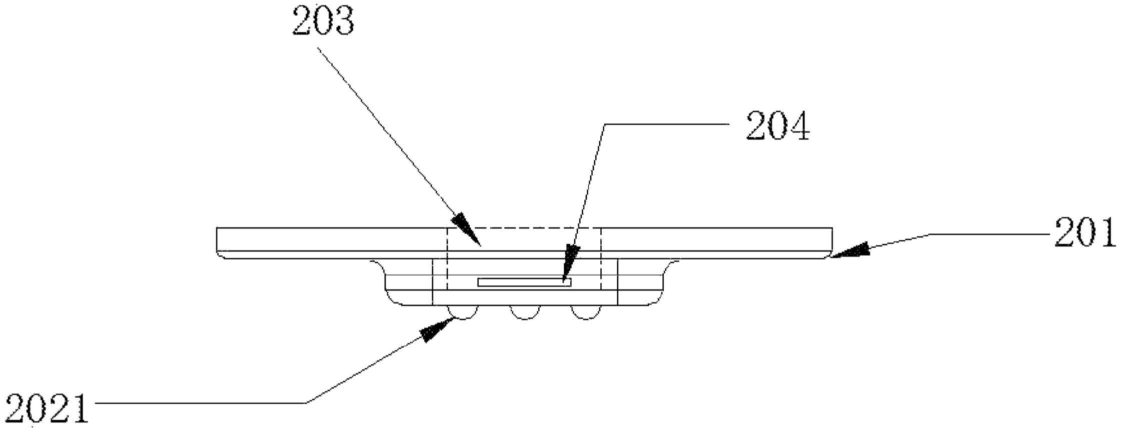
FIG. 5 is a schematic upward view of the magnetic attraction device of the glove magnetic attraction kit device according to the embodiment of the disclosure.

Referring to FIG. 1, FIG. 2, FIG. 3, FIG. 4 and FIG. 5, an embodiment of the disclosure includes a pair of glove bodies 100, and magnetic attraction devices 200 are arranged on the wrist parts of the glove bodies 100 respectively. Each of the magnetic attraction devices 200 includes a base 201, a middle of the base 201 is provided with a blind hole 203, and a hollow convex plate 202 configured to place a magnetic attraction body is arranged on the base 201.

In an embodiment, the magnetic attraction device is connected to the wrist part of the glove body 100 through a sewing thread 300.

In an embodiment, the base 201 is an elliptical base. In an embodiment, the elliptical base 201 has a size of 24 mm*40 mm and a thickness of 2 mm.

The blind hole 203 is arranged in the middle of the base 201, and the magnetic attraction body (not shown in the figures) is placed in the hollow convex plate 202 through the blind hole 203. When the magnetic attraction body needed to take out, the magnetic attraction body can be taken out from the blind hole 203.

In an embodiment, the blind hole 203 has a diameter of 10 mm and a depth of 4 mm.

When the base 201 is sewn inside the glove body 100, it is not convenient to take out the magnetic attraction body. In an embodiment, a side of the convex plate 202 is provided with an opening 204 for taking out the magnetic attraction body.

In this embodiment, the opening 204 is arranged on the side of the convex plate 202 to facilitate to take out the magnetic attraction body and replace the magnetic attraction body better, so as to ensure the better magnetic attraction storage effect of the glove body 100.

In an embodiment, a distance between the opening 204 and a top of the convex plate 202 is 1.2 mm. The opening 204 is an expansion opening for taking out the magnetic attraction body.

In an embodiment, at least one identification post 2021 is arranged on the convex plate 202.

In an embodiment, the identification post 2021 is a circular-shaped post, and the identification post 2021 is provided with three on the convex plate.

In this embodiment, the three identification posts 2021 are arranged 4.5 mm below a center point of the convex plate 202, an average center distance among the three identification posts 2021 is 4 mm, and the three identification posts 2021 respectively are three semicircles each with a diameter of 2 mm. The three identification posts 2021 play the role of identification in the direction of the opening 204.

In an embodiment, the magnetic attraction device 200 is made of a silica gel material. The silica gel material adopts silica gel material that meets the food grade standard of Food and Drug Administration (FDA).

In this embodiment, the magnetic attraction device 200 is made of the silica gel material, which makes the magnetic attraction device 200 more soft and wear-resistant, and has better installation and use effect.

In an embodiment, the magnetic attraction body is a cylinder with a diameter of 10 mm and a thickness of 4 mm.

In an embodiment, the magnetic attraction body can adopt a magnetic attraction body made of rare earth neodymium boron strong magnetic material, which makes the magnetic attraction effect better and easier to achieve the purpose of the disclosure.

The magnetic attraction device 200 of the disclosure is a suitable and commonly used magnetic attraction kit, which is made into a commonly used and appropriate size. When it is not suitable for the magnetic scene, the internal magnetic material (such as magnetic attraction body) can be quickly disassembled without using any tools to realize the function of ordinary gloves.

The disclosure has the advantages of reasonable structure, light weight, easy manufacture, low cost, convenient installation and maintenance, can prevent the loss of gloves, save time, and especially improve the work efficiency in the workplace.

The above description is only exemplary embodiments of the disclosure, which does not limit the scope of the disclosure. On the premise of not departing from the spirit and scope of the disclosure, the disclosure will also have various changes and improvements. Under the concept of the disclosure, the equivalent structural transformation made by using the contents of the specification and attached drawings of the disclosure, or directly/indirectly applied in other relevant technical fields are included in the protection scope of the disclosure.

What is claimed is:

1. A glove magnetic attraction kit device, comprising:

glove bodies;

magnetic attraction devices, arranged on wrist parts of the glove bodies respectively; wherein each of the magnetic attraction devices comprises:

a base, wherein a middle of the base is provided with a blind hole;

a convex plate, arranged on the base;

a magnetic attraction body, disposed in the convex plate; wherein the blind hole penetrates the base to an inside of the convex plate for placing the magnetic attraction body, and the convex plate defines an opening configured for taking out the magnetic attraction body; and at least one identification post, disposed on a side of the convex plate facing away from the base and located close to the opening, and configured to identify a position of the opening;

wherein the at least one identification post comprises: a plurality of identification posts, the plurality of identification posts are three identification posts, which are arranged below a center point of the convex plate, an average center distance among the three identification posts is 4 mm, and the three identification posts respectively are three semicircles each with a diameter of 2 mm.

2. The glove magnetic attraction kit device according to claim 1, wherein each magnetic attraction device is made of a silica gel material; and each magnetic attraction device is connected to the wrist part of the glove body through a sewing thread.

3. The glove magnetic attraction kit device according to claim 2, wherein a shape of the base of each magnetic attraction device is elliptical.

4. The glove magnetic attraction kit device according to claim 3, wherein the base of each magnetic attraction device is an elliptical base with a size of 24 millimetres (mm)*40 mm and a thickness of 2 mm.

5. The glove magnetic attraction kit device according to claim 4, wherein the blind hole of each magnetic attraction device has a diameter of 10 mm and a depth of 4 mm.

6. The glove magnetic attraction kit device according to claim 5, wherein a size of the convex plate of each magnetic attraction device is 18 mm*15 mm*3 mm.

7. The glove magnetic attraction kit device according to claim 6, wherein a distance between the opening and a top of the convex plate in each magnetic attraction device is 1.2 mm.

8. The glove magnetic attraction kit device according to claim 6, wherein the magnetic attraction body of each magnetic attraction device is a cylinder with a diameter of 10 mm and a thickness of 4 mm.

* * * * *